Patented May 15, 1951

2,553,430

UNITED STATES PATENT OFFICE 2,553,430

SOLUBLE INTERPOLYMERS OF TRIS-2-AL-KENYL ACONITATES AND 2-ALKENYL CHLORIDES

Pliny O. Tawney, Passaic, N. J., assignor to United States Rubber Company, New York, N. Y., a corporation of New Jersey No Drawing. Application April 15, 1948, Serial No. 21,320

7 Claims. (Cl. 260—78.5)

This invention relates to a new class of soluble, unsaturated polymeric materials which are prepared by the copolymerization of a tris-2-alkenyl aconitate with a 2-alkenyl chloride and characterized in that they can be converted by heat and/or catalysts to insoluble, infusible products by further polymerization or by copolymerization with other unsaturated organic materials capable of addition polymerization therewith.

It is known in the art that tris-2-propenyl aconitates, e. g., triallyl aconitate, slowly polymerize to form insoluble and infusible resins when no more than a minor amount of the monomeric material has been converted to the polymeric form. Such products are usually a heterogeneous mixture of insoluble gel, low molecular weight polymers and unpolymerized monomeric material which is of little or no commercial value in coating, impregnating and molding applications wherein a soluble, fusible polymer capable of ultimate conversion to the insoluble, infusible state is preferred or required. Soluble polymers of tris-2-propenyl aconitates can be obtained by halting the polymerization before gelation occurs although this method is of little practical value in view of the low yield of soluble polymer thus obtained and the necessity for recovering the large proportion of unreacted starting material for use in subsequent polymerization. Moreover, the use of high reaction temperatures, large amounts of catalyst, inhibitors or diluents or other devices suggested by the prior art effect only a disproportionately small improvement in the yield of the resulting soluble polymer and in such cases additional operating steps are necessary in processing the polymers to remove solvents, catalyst fragments, inhibitors, etc.

I have now found that the amount of the monomeric tris-2-alkenyl aconitates convertible to the soluble, polymeric form can be very markedly increased by interpolymerization thereof with a 2-alkenyl chloride from the class of allyl, 2-methallyl, 2-ethallyl, 2-chloroallyl, 2-(hydroxymethyl) allyl, 2-(chloromethyl) allyl, tiglyl, crotyl, 4-chlorocrotyl, and cinnamyl chlorides, of which those containing the terminal methylene group are preferred, e. g., allyl chloride, 2-methallyl chloride and 2-chloroallyl chloride. Other 2-alkenyl halides such as methallyl fluoride, allyl bromide and allyl iodide are operable in my invention but are effective to a lesser and varying degree. The 2-alkenyl bromides and iodides suffer the additional disadvantage of imparting poor color stability to the resulting interpolymers, particularly at elevated temperatures.

Suitable tris-2-alkenyl aconitates include the esters of aconitic acid with 2-alkenyl alcohols from the class of allyl, 2-methallyl, 2-ethallyl, 2-chloroallyl, 2-(hydroxymethyl) allyl, 2-(chloromethyl) allyl, tiglyl, crotyl, 4-chlorocrotyl, and cinnamyl alcohols, and preferably with those alcohols which contain a terminal methylene group, e. g., triallyl aconitate and trimethallyl aconitate.

There is nothing critical about the minimum amount of the selected monomeric tris-2-alkenyl aconitate which is chosen to be converted to the soluble interpolymerizate (it obviously being used in more than negligible amount) and the maximum amount chosen will be in accordance with the desires of the operator, the only criterion being that for each molar equivalent of the aconitate there be used at least 0.3 molar equivalent of the interpolymerizing chloride. There is no critical upper limit on the amount of the chloride, since where it is used in excess of the combining proportions, the excess acts simply as an inert solvent carrier for the formed soluble interpolymerizate.

In contrast to the prior art, my method is effective at moderate reaction temperatures and requires none of the special precautions, e. g., presence of inhibitors, employed by the art in attempts to delay or avert gelation. Since my reaction yields more uniform and homogeneous products, elaborate purification procedures are unnecessary.

The interpolymerization reaction of my invention is carried out by heating each molecular equivalent of the tris-2-alkenyl aconitate with preferably from 0.3 to 8.0 molar equivalents of a 2-alkenyl chloride as defined above. The reaction is carried out at temperatures of from 25 to 120° C., or higher, and preferably in the range of from 50 to 110° C. and for times sufficient to effect an adequate degree of reaction, such times being within the range of 2–200 hours, and usually in the range of 10–150 hours.

The reaction is promoted by a source of free radicals such as peroxidic compounds among which are the organic peroxides, e. g., acetyl peroxide, benzoyl peroxide and tert.-butyl hydroperoxide. These promoters are employed in amounts of from 0.1 to 20% and preferably to 1.0 to 15% by weight of the reactant mixture.

The course of the interpolymerization can be followed by observing the increase in the viscosity of the reaction mixture and the resulting interpolymers can be isolated by the addition of a non-solvent such as diethyl ether or n-hexane or by removal of the unreacted starting materials by extraction or distillation. Although unnecessary for many commercial applications, further purification of my interpolymers can be effected by dissolving them in a minimum volume of a solvent such as acetone and reprecipitating them with one of the above-mentioned non-solvents. Concentration of the precipitating bath in some cases yields a further amount of low molecular weight interpolymers which are likewise useful in various commercial applications.

My new interpolymers can be employed in the repeated solution in a minimum volume of acetone and reprecipitation by the addition of an excess of n-hexane. The products are finally dried in vacuo to constant weight.

In Table I below are summarized the amounts of the monomeric starting materials, the peroxide and the polymeric products, as well as the reaction times. Included below (I—a) is an example of the prior art polymerization of triallyl aconitate in the absence of a 2-propenyl chloride, which serves to emphasize the advantages of my invention.

TABLE I

| | Triallyl Aconitate | 2-Alkenyl Chloride | | Benzoyl Peroxide | Reaction Time (hours) | Polymeric Product |
|---|---|---|---|---|---|---|
| a | 100 | | | 3.0 | 16.3 | 37.0 |
| b | 100 | Allyl chloride | 100.0 | 6.0 | 52.0 | 85.6 |
| c | 100 | Methallyl chloride | 10.0 | 2.0 | 72.0 | 51.5 |
| d | 100 | Methallyl chloride | 100.0 | [1] 12.0 | [2] 144.0 | 93.6 |
| e | 100 | 2-(Chloromethyl) allyl chloride | 100.0 | 6.0 | 47.5 | 80.0 |
| f | 100 | 2,3-Dichloropropene | 100.0 | 6.0 | [2] 48.0 | 121.0 |

[1] Peroxide added in 5 equal increments at 24-hour intervals.
[2] No evidence of gelation.

solid form as molding powders. They can also be employed as coating and impregnating agents by dissolving them in appropriate solvents, or the crude interpolymerization reaction mixtures may themselves be employed by the addition of suitable higher-boiling solvents and subsequently distilling off any unreacted 2-alkenyl chloride. Moreover, my new interpolymers can be dissolved in liquid, polymerizable, ethylenic compounds, e. g., benzyl acrylate, tolyl acrylate, methyl acrylate, allyl acrylate, butyl methacrylate, vinyl butyrate, diethyl fumarate, and diallyl fumarate, to form solutions capable of total polymerization leaving no solvent to be evaporated. Such solutions are particularly useful in molding operations wherein products capable of undergoing a curing process with a minimum of shrinkage are desirable. Various inert addends can be incorporated with my interpolymers including dyes, pigments, fillers, and plasticizers, preferably in the soluble, fusible stage prior to final cure. The utility of my new interpolymers in such applications as those cited above is enhanced by their flame-retardant properties which are unusually effective when the 2-alkenyl chloride with which the tris-2-alkenyl aconitate is interpolymerized contains additional halogen, e. g., 2-chloroallyl chloride.

Application of heat at temperatures such as 60–120° C., to compositions containing my new unsaturated interpolymers, particularly in the presence of a polymerization catalyst such as a peroxide, induces further polymerization and the resulting cross-linked products are essentially infusible and are strongly resistant to attack by solvents.

The following examples disclose my invention in more detail. All parts are by weight.

Example 1

Mixtures of triallyl aconitate with various 2-alkenyl chlorides, together with benzoyl peroxide, are heated at 60° C. until in each mixture the point of incipient gelation is attained or no further increase in the viscosity of the reaction mixture is detectable. The reaction mixtures are then cooled and diluted with an excess of n-hexane whereby the polymeric materials are precipitated. The latter are further purified by From Table I above it is apparent that the interpolymerization of triallyl aconitate with even a small amount of the 2-alkenyl chloride effects a very significant increase in the amount of the triallyl aconitate which is converted to the soluble polymeric form and that as the amount of the copolymerizable 2-alkenyl chloride present is increased, a corresponding increase occurs in the amount of the triallyl aconitate converted to the soluble polymeric form.

Example 2

A mixture of 200 parts of triallyl aconitate, 200 parts of methallyl chloride and 2 parts of benzoyl peroxide is heated at 60° C. for approximately 150 hours during which time an additional 20 parts of benzoyl peroxide are added in approximately equal increments at 24-hour intervals. The reaction product is then isolated and purified in the manner of Example 1 to yield approximately 103.0 parts of soft solid containing 10.69% chlorine, which corresponds to a copolymer containing approximately 27.4% by weight of methallyl chloride and 72.6% of triallyl aconitate.

Heating a sample of the copolymer with 2% of benzoyl peroxide at 100° C. results in a hard, acetone-insoluble product.

Example 3

Example 1—f is repeated and upon analysis is found to contain 16.1% chlorine, which corresponds to a copolymer containing approximately 25.2% by weight of 2,3-dichloropropene and 74.8% of triallyl aconitate.

Five parts of the copolymer of Example 3 are dissolved in 2 parts of diethyl fumarate together with 0.2 part of benzoyl peroxide. The solution is poured into a cylindrical mold and heated at 90° C. for 24 hours and then for 3 hours at 100° C. to yield a hard casting which is insoluble in acetone and alcohol.

Having thus described my invention, what I claim and desire to protect by Letters Patent is:

1. An organic solution of an unsaturated acetone-soluble interpolymerizate of a molar equivalent of a tris-2-alkenyl aconitate from the class consisting of triallyl aconitate and trimethallyl aconitate with at least 0.3 molecular equivalent of a 2-alkenyl chloride from the class consisting of allyl chloride and methallylchloride.

2. An organic solution of an unsaturated acetone-soluble interpolymerizate of a molar equivalent of a tris-2-alkenyl aconitate from the class consisting of triallyl aconitate and trimethallyl aconitate with at least 0.3 molecular equivalent of allyl chloride.

3. An organic solution of an unsaturated acetone-soluble interpolymerizate of a molar equivalent of a tris-2-alkenyl aconitate from the class consisting of triallyl aconitate and trimethallyl aconitate with at least 0.3 molecular equivalent of methallyl chloride.

4. An organic solution of an unsaturated acetone-soluble interpolymerizate of a molar equivalent of triallyl aconitate with at least 0.3 molecular equivalent of allyl chloride.

5. An organic solution of an unsaturated acetone-soluble interpolymerizate of a molar equivalent of trimethallyl aconitate with at least 0.3 molecular equivalent of allyl chloride.

6. An organic solution of an unsaturated acetone-soluble interpolymerizate of a molar equivalent of triallyl aconitate with at least 0.3 molecular equivalent of methallyl chloride.

7. A method which comprises interpolymerizing, by heating in the presence of a peroxidic polymerization catalyst, a molar equivalent of a tris-2-alkenyl aconitate from the class consisting of triallyl aconitate and trimethallyl aconitate with at least 0.3 molecular equivalent of a 2-alkenyl chloride from the class consisting of allyl chloride and methallyl chloride.

PLINY O. TAWNEY.

REFERENCES CITED

The following references are of record in the file of this patent:

UNITED STATES PATENTS

| Number | Name | Date |
|---|---|---|
| 2,378,195 | D'Alelio | June 12, 1945 |
| 2,433,616 | Marple et al. | Dec. 30, 1947 |
| 2,498,084 | Kuderna et al. | Feb. 21, 1950 |
| 2,498,099 | Tawney et al. | Feb. 21, 1950 |